(12) United States Patent
Sreekumar (10) Patent No.: US 10,176,516 B2
(45) Date of Patent: Jan. 8, 2019

(54) OFFLINE CREATION OF MARKETPLACE LISTINGS

(71) Applicant: Amazon Technologies, Inc., Seattle, WA (US)

(72) Inventor: Sooraj Sreekumar, Vatakara (IN)

(73) Assignee: Amazon Technologies, Inc., Seattle, WA (US)

( * ) Notice: Subject to any disclaimer, the term of this patent is extended or adjusted under 35 U.S.C. 154(b) by 685 days.

(21) Appl. No.: 14/726,219

(22) Filed: May 29, 2015

(65) Prior Publication Data
US 2016/0350840 A1    Dec. 1, 2016

(51) Int. Cl.
| | | |
|---|---|---|
| *G06Q 30/00* | (2012.01) | |
| *G06Q 30/06* | (2012.01) | |
| *H04W 24/08* | (2009.01) | |
| *H04L 12/26* | (2006.01) | |
| *H04L 29/08* | (2006.01) | |
| *G06Q 30/02* | (2012.01) | |

(52) U.S. Cl.
CPC ..... *G06Q 30/0641* (2013.01); *G06Q 30/0276* (2013.01); *G06Q 30/0601* (2013.01); *G06Q 30/0613* (2013.01); *H04L 43/08* (2013.01); *H04L 67/2842* (2013.01); *H04L 67/32* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 2002/0161826 A1 | 10/2002 | Arteaga et al. | |
| 2004/0073498 A1* | 4/2004 | Breen, Jr. | .......... G06Q 30/0621 705/26.5 |
| 2006/0161646 A1 | 7/2006 | Chene et al. | |
| 2006/0173752 A1 | 8/2006 | Bowlus et al. | |

(Continued)

FOREIGN PATENT DOCUMENTS

EP      0993165      4/2000

OTHER PUBLICATIONS

Brown, Kevin, M-TCP: TCP for Mobile Cellular Networks, Oct. 1997, ACM SIGCOMM Computer Communication Review, pp. 19-43 (Year: 1997).*

(Continued)

*Primary Examiner* — William J Allen
*Assistant Examiner* — Timothy J Kang
(74) *Attorney, Agent, or Firm* — Lee & Hayes, PLLC (57) ABSTRACT

An online marketplace system may allow sellers to create listings for items to sell. A seller may create a listing using an application installed on the seller's mobile device. The application may be configured so that a seller can very quickly provide information regarding an item, and therefore create a listing within minimal time investment. The application monitors data connectivity and detects connectivity problems that may create delays in providing item information to the online marketplace system. When there are problems with connectivity, the application caches the item information so that the user of the application does not perceive any latencies. When data connectivity improves, the application sends the cached item information to the online marketplace system for creation of the listing.

21 Claims, 4 Drawing Sheets

(56) References Cited

U.S. PATENT DOCUMENTS

| | | | |
|---|---|---|---|
| 2008/0270548 A1* | 10/2008 | Glickstein | G06Q 10/107 |
| | | | 709/206 |
| 2014/0258010 A1* | 9/2014 | Mardikar | G06Q 20/202 |
| | | | 705/21 |
| 2014/0279125 A1* | 9/2014 | Godsey | G06Q 20/3255 |
| | | | 705/26.1 |
| 2015/0081630 A1* | 3/2015 | Linsalata | G06Q 50/01 |
| | | | 707/617 |

OTHER PUBLICATIONS

PCT Search Report and Written Opinion dated Jul. 14, 2016 for PCT Application No. PCT/US16/33999, 12 pages.

* cited by examiner

FIG. 1

CREATE LISTING (2) — 208

WHAT DO YOU WANT TO SELL? — 210(a)
Ex. 1974 MALIBU

CATEGORY — 210(b)
SELECT ▶

CONDITION — 210(c)
● NEW   ○ USED—LIKE NEW   ○ USED

PRICE — 210(d)
ENTER PRICE

DESCRIPTION — 210(e)
ENTER DESCRIPTION

LOCATION — 210(f)
CHOOSE A CITY ▶

CONTACT INFORMATION — 210(g)
ENTER TELEPHONE NUMBER

POST — 210(h)

CREATE LISTING (1) — 204

1. ADD PHOTO(s)

+ ADD   + ADD
+ ADD   + ADD

OFFLINE CREATION OF MARKETPLACE LISTINGS

BACKGROUND

Certain types of online marketplaces allow private sellers to list items for sale to others. In some cases, a seller may use a mobile device such as a smartphone to provide listing information and to create a listing on the online marketplace for an item. For example, the seller may use an application installed on their smartphone to fill out a form with basic information about the item such as the name of the item, a part number of the item, a description of the item, and a price of the item. The seller may also take pictures of the item, using camera capabilities of the smartphone, and include the pictures as part of the listing.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The following detailed description is directed to concepts and technologies for using a mobile computing device such as a smartphone for quickly listing items for sale on an online marketplace. In a described embodiment, a seller uses a marketplace application installed on their mobile device to provide listing information to the online marketplace. The listing information may include things such as an item title, an item category, an item condition, an item description, an item price, a location of the seller, contact information of the seller, etc. The listing information may also include pictures and/or video of the item.

The marketplace application is designed to allow a seller to create a listing with minimal effort. For example, the marketplace application may prompt the seller to provide one or more pictures of an item. The user may select pictures that are either stored on or accessible by the mobile device or may take new pictures using camera capabilities of the mobile device. The marketplace application may also prompt the seller for other listing information. In order to ease the process of data entry, the marketplace application may use drop-down controls, checkboxes, and radio controls whenever possible. Generally, the user interface presented by the marketplace application is designed for simplicity, ease of use, and to require only a minimal amount of typed information.

In order to create the listing, the marketplace application communicates with the online marketplace through the Internet. In many situations, data connectivity for the mobile device may be through wireless, cellular communication systems provided with varying degrees of speed and reliability by telecommunications providers.

In certain geographic areas and or at certain times, cellular data connectivity by the mobile device may be slow, intermittent, or completely unavailable. This presents a problem, in that the marketplace application is unable to quickly upload listing information provided by a seller to the online marketplace. Any delay or difficulty in uploading listing information to the online marketplace tends to defeat a primary design goal of the marketplace application, which is to allow a user to quickly and spontaneously create an item listing. When there are delays due to problems with data connectivity, the user experience may become tedious and the seller may be discouraged from further use of the online marketplace. Furthermore, intermittent connectivity may cause problems or errors in creating a listing, and at times may cause issues requiring the user to re-enter previously entered information.

In order to provide a good user experience in the face of data connectivity problems, the marketplace application is configured to detect such data connectivity problems and in response to locally cache listing information provided by the seller. The marketplace application then monitors data connectivity quality and/or availability, and uploads the cached listing information to the online marketplace when communications again become available between the mobile computing device and the online marketplace.

More generally, the marketplace application may evaluate connectivity of the mobile computing device in terms of one or more connectivity criteria. The connectivity criteria may relate to things such as:

whether connectivity is currently available between the mobile computing device and the online marketplace;

whether the available connectivity between the mobile computing device and the online marketplace is currently metered or unmetered;

whether the available connectivity between the mobile computing device and the online marketplace is intermittent;

the current rate of dropped data between the mobile computing device and the online marketplace;

the current speed of the data connectivity between the mobile computing device and the online marketplace; and the current cost of transferring data between the mobile device and the online marketplace system, based on the current type of data connectivity that is currently being implemented by the mobile computing device.

If the current status of data connectivity satisfies the criteria, the marketplace application operates in an online mode, in which listing data provided by the seller is uploaded immediately to the online marketplace. If the current status of data connectivity does not satisfy the criteria, the marketplace application enters an offline mode, in which listing data is cached by the mobile device and uploaded to the online marketplace at a later time when the criteria become satisfied.

Figure 1:
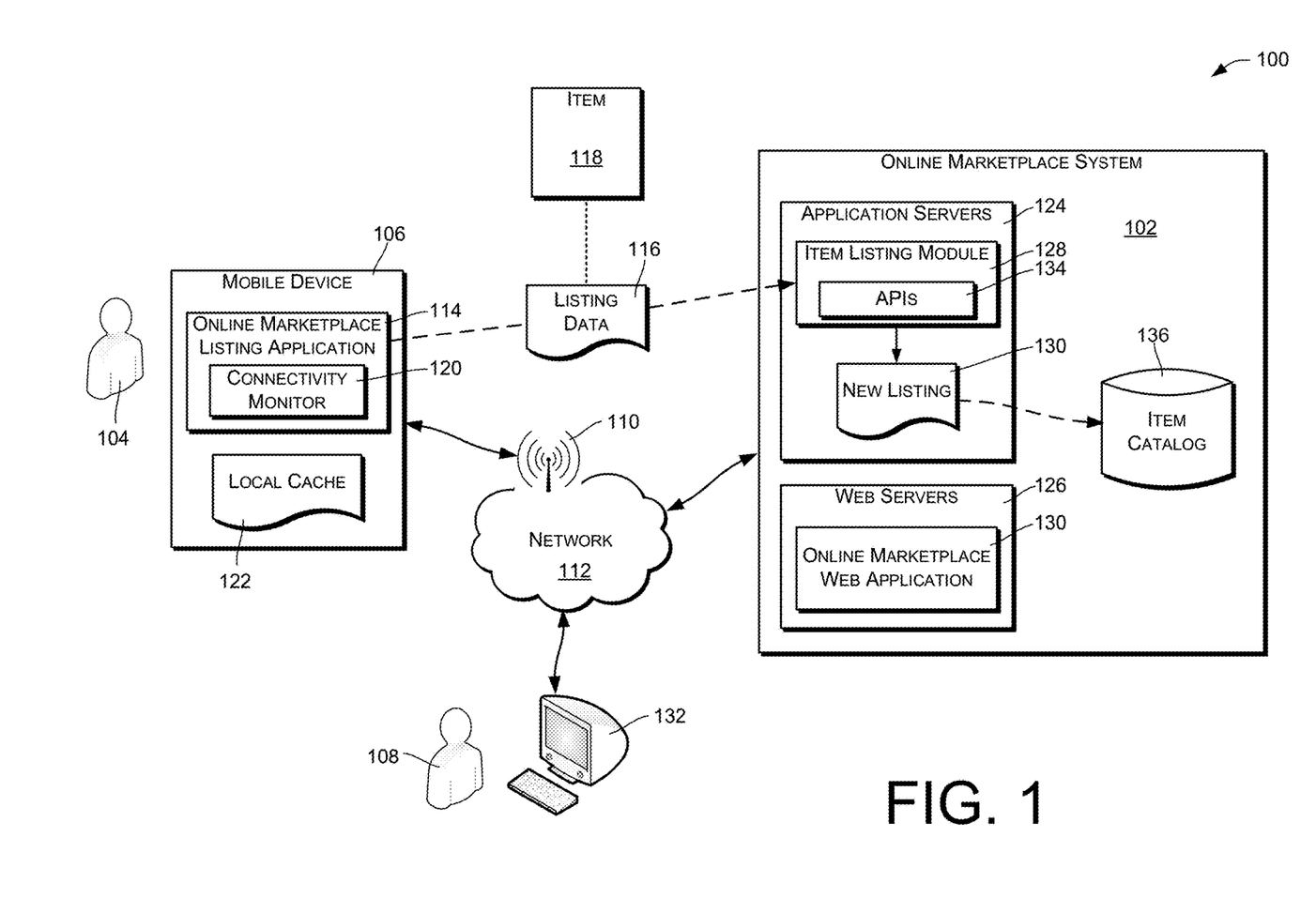
FIG. 1 is a block diagram illustrating an architecture in which an online marketplace system may be used.

FIG. 1 and the accompanying description are intended to provide a brief, general description of a suitable computing environment in which the embodiments described herein may be implemented. In particular, FIG. 1 is a system diagram that shows an illustrative operating environment 100 for an online marketplace system 102, including several software components for implementing the embodiments described herein.

The online marketplace system 102 implements an online marketplace that a seller 104 may access to list items for sale using the seller's mobile device 106. The online marketplace system 102 also allows customers, such as a customer 108, to browse and purchase the listed items. The term "online" is used to indicate a service that is accessible remotely, using network communications and infrastructures such as provided by the public Internet and/other communication systems such as cellular data networks, private networks, and so forth. In some cases, the online marketplace system 102 may be accessible using an Internet browser from a computing device such as a personal computer, tablet computer, smartphone, etc. In some cases, the online marketplace may be accessible from a dedicated and special-purpose software application installed on a device such as a personal computer, tablet computer, smartphone, etc.

In the example embodiment described herein, the mobile device 106 may comprise a smartphone or other computing device that is personally associated with the seller 104. Examples of mobile computing devices include smartphones, tablet computers, laptop computers, personal digital assistants (PDAs), wearable computing devices, voice-based computing devices, gesture-based devices, and so forth. Note that although certain techniques are described herein as being employed by a mobile device, similar or identical techniques may be used by various other types of devices, not limited to mobile devices.

The mobile device 106 consumes data from a cellular data network 110, which also provides more general connectivity to a public, wide-area network (WAN) 112 such as the Internet. The cellular data network 110 may be implemented using one or more of various types of cellular technologies, such as CDMA (code division multiple access) and GSM (global system for mobiles). Different cellular networks may provide different levels of data transfer speeds. Networks may, for example, be classified as 2G ($2^{nd}$ generation), 3G ($3^{rd}$ generation) or 4G ($4^{th}$ generation), LTE (long-term evolution), etc., where newer service classifications generally provide higher level of service.

The type and quality of service available to the mobile device 106 may vary over time as a function of the seller's geographic location. In more populated areas cellular coverage may be relatively consistent from one location to another. In less populated areas, and in many developing countries, cellular coverage may be slower, more intermittent, and less consistent with varying locations.

In addition to the data connectivity provided by the cellular data network 110, the mobile device 106 may also access the network 112 by other means, such as by accessing types of wired and wireless networks, including WiFi networks. In many cases, WiFi networks may provide higher speeds and higher reliability than cellular networks. In addition, WiFi data connectivity may in some cases be free or less expensive than cellular data connectivity. In some cases, WiFi data connectivity may be unmetered, such as when the user of the mobile device 106 pays for a monthly subscription of unlimited data. Cellular data connectivity, on the other hand, may be metered, and the user may pay for cellular data connectivity as a function of the amount of data used by the mobile device 106.

The mobile device 106 has an online marketplace listing application 114 that the seller 104 may use to provide listing data 116 to the online marketplace system 102. The online marketplace listing application 114 may be a program that is obtained and installed on the mobile device 106 from an application repository or marketplace. Thus, a user of the mobile device 106 may obtain and install the listing application 114 after purchasing the mobile device 106.

The listing data 116 may relate to an item 118 that the seller 104 wishes to sell using the online marketplace system 102. The listing data 116 may include information about the item 118 such as a name or title of the item 118, a part number of the item 118, a description of the item 118, a price of the item 118, and one or more pictures, videos, or other multimedia content regarding the item 118. The listing data 116 may also include information about the seller 104, such as the location of the seller 104 and contact information for the seller 104.

Figure 2A:
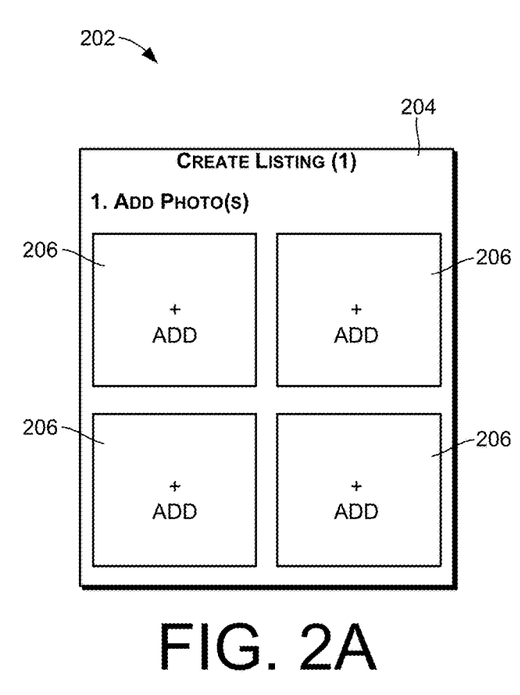
FIGS. 2A and 2B are diagrams of example user interface screens.
Figure 2B:
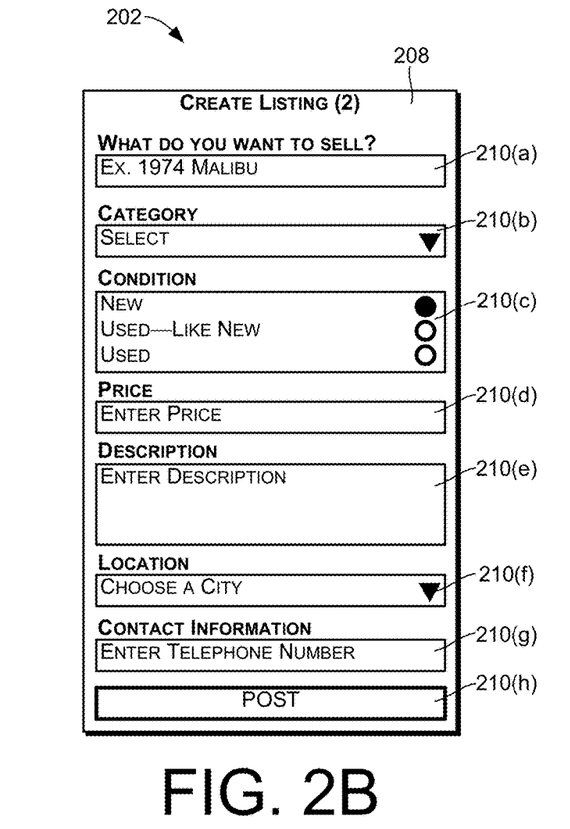

FIGS. 2A and 2B show examples of a user interface 202 that may be implemented by the listing application 114 to allow the seller 104 to create a listing on the online marketplace system 102. For example, the user interface 202 may be displayed on a display surface of the mobile device in response to initiating the listing application 114. Generally, the user interface 202 has controls that are accessible by the seller 104 to provide information regarding the item 118 and/or regarding a requested listing of the item 118.

FIG. 2A shows an input screen 204 that may be presented on a display of the mobile device 106 in response to the seller 104 indicating a desire to sell the item 118. The input screen 204 comprises controls 206 that the seller 104 may select to specify photographs of the item 118. After selecting one of the displayed controls 206, the seller 104 is guided through a process of either selecting a photograph that is stored on the mobile device 106 or capturing a new photograph using camera capabilities of the mobile device 106. The seller 104 may specify one or more photographs of the item 118 in this manner, using different ones of the controls 206. After specifying a photograph, the photograph is displayed as thumbnail image in place of the control 206.

FIG. 2B shows a subsequent input screen 208 that may be presented on the display of the mobile device 106 to solicit additional information regarding the item 118. The input screen 208 comprises a sequence of graphical user input fields or controls 210 that the seller 104 can access to specify information about the item 118, including contact information regarding the seller 104.

A first control 210(a) allows the seller 104 to specify a name of the item 118 or a title for a listing of the item. A second control 210(b) allows the seller 104 to specify a sales category of the item 118. A third control 210(c) allows the seller 104 to specify the condition of the item 118 (new, used, etc.). A fourth control 210(d) allows the seller 104 to specify the price of the item 118. A fifth control 210(e) allows the seller 104 to specify a textual description of the item. A sixth control 210(f) allows the seller 104 to specify his or her location. A seventh control 210(g) allows the seller 104 to specify his or her telephone number.

The controls 210 also include a "Post" control 210(h) that may be selected by the seller 104 to submit all of the provided information to the online marketplace system 102 and to create a new listing based on the provided information.

Returning to FIG. 1, the listing application 114 implements or accesses a connectivity monitor 120 that evaluates measures of connectivity. The connectivity monitor 120 may access operating system components of the mobile device 106 to obtain connectivity information. Alternatively, the connectivity monitor 120 may simply monitor its attempts to communicate with the online marketplace system 102 and may determine the current status of device connectivity in light of the monitored communication attempts. For example, the connectivity monitor 120 may note a number of failed attempts to transmit the listing data 116 to the online marketplace system 102, and may conclude based on the failed attempts that reliable connectivity is not currently available. In other embodiments, the connectivity monitor 120 may monitor and/or evaluate factors such as data drop/loss rates, speed of current connectivity, whether the device 106 is using metered or unmetered data, cost of current connectivity, intermittency of current connectivity, and other factors.

The connectivity monitor 120 may evaluate these factors in comparison to predefined criteria. Based on the comparison of the factors with the predefined criteria, the connectivity monitor 120 may determine whether or not the current status of data connectivity is adequate for real-time submission of the listing data 116, or whether an offline, caching mode should be used instead in order to delay submission of the listing data 116 until a later time at which there is better data connectivity.

In situations wherein the connectivity monitor 120 determines that current connectivity conditions are inadequate for real-time submission of the listing data 116, the listing application 114 may enter a caching mode, in which the listing data captured by the user interface 202 is cached temporarily by the mobile device 106, in a local memory cache 122. The local memory cache 122 may comprise memory of the mobile device 106 that is associated with the listing application 114 or may comprise more general device memory that is accessible to the listing application 114, depending on the operating system of the mobile device 106.

When operating in a caching mode, the user interface 202 is used as already described to obtain the listing data 116. As the listing data 116 is obtained, however, it is stored in the local cache 122 rather than being transmitted to the online marketplace system 102. At a future time, when the connectivity monitor 120 determines that device connectivity is adequate for communications with the online marketplace system 102, the listing application retrieves the listing data 116 from the local cache 122 and transmits it to the online marketplace system 102.

Services of the marketplace system 102 may be implemented by a number of application servers 124 and World Wide Web ("Web") servers 126. The application servers 124 and Web servers 126 may be implemented as standard server computers, database servers, network appliances, desktop computers, other computing devices, and any combination thereof. The application servers 124 and Web servers 126 may execute a number of modules, such as an item listing module 128 and an online marketplace Web application 130, in order to provide online marketplace services. The modules may execute on a single application server or Web server, or in parallel across multiple application servers and/or Web servers in the online marketplace system 102. In addition, each module may consist of a number of subcomponents executing on different application servers 124, Web servers 126, or other computing devices of or associated with the online marketplace system 102. The modules may be implemented as software, hardware, or any combination of the two.

Customers, such as the customer 108, may utilize user computing devices 132, such as personal computers ("PC"), desktop workstations, laptops, smartphones, notebooks, personal digital assistants ("PDA"), wireless devices, electronic book readers, tablet computers, voice-enabled devices, gesture-enabled devices, or other personal computing devices, to browse, search, and purchase items available through the online marketplace through functionality provided by the online marketplace Web application 130 executing on the one or more Web servers 126.

The item listing module 128 executing on the application servers 124 provides functionality for receiving the listing data 116 and creating a new listing for an item in the online marketplace. The item listing module 128 may have APIs (application programming interfaces) 134 that are accessible by the listing application 114 via network communications through the network 112.

The online marketplace system 102 maintains an item catalog 136, comprising one or more databases containing details regarding items listed by sellers 104 to be presented to customers 108 wishing to browse and/or purchase items from the online marketplace. The item catalog 136 includes data describing each of the items for sale from the online marketplace, as provided by the user interface 202 of FIG. 2.

If a customer 108 purchases the item 118 after the item 118 has been listed by the online marketplace system 102, the online marketplace system 102 may transmit a notification to the listing application 114, which in turn may provide a notification to the seller 104.

Figure 3:
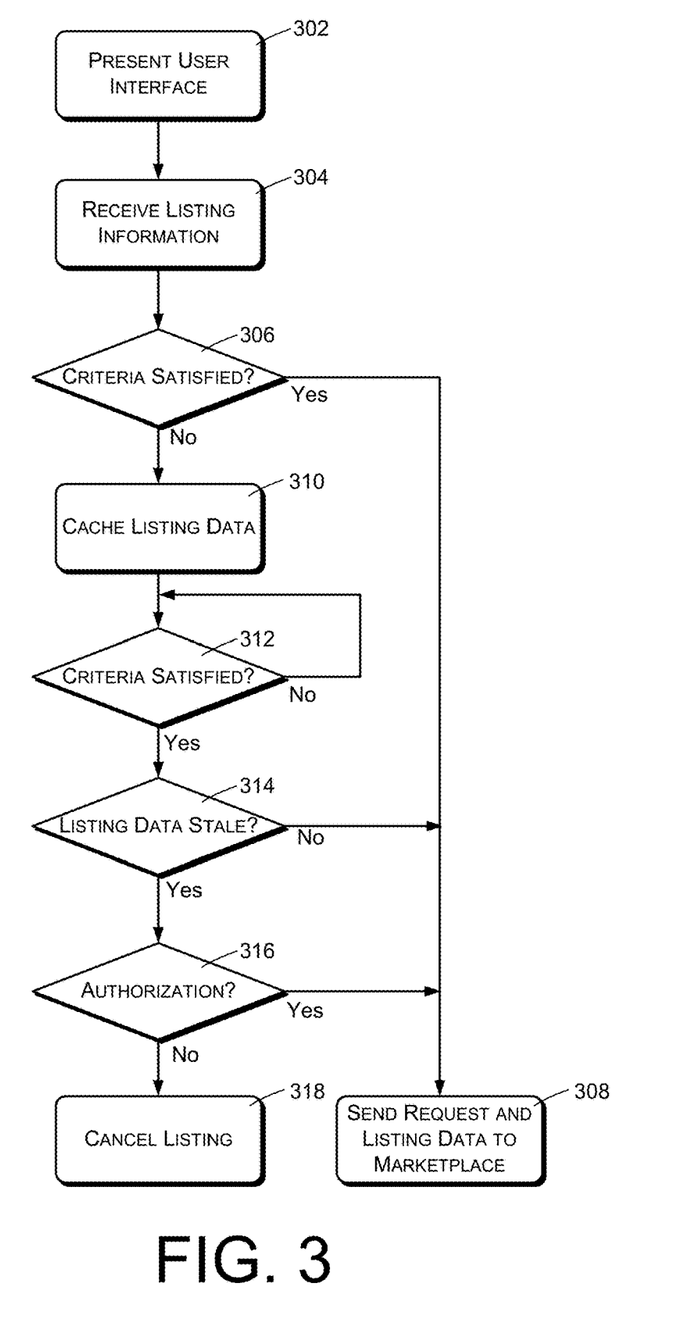
FIG. 3 is a flow diagram illustrating an example method of creating listings in an online marketplace system.
Figure 4:
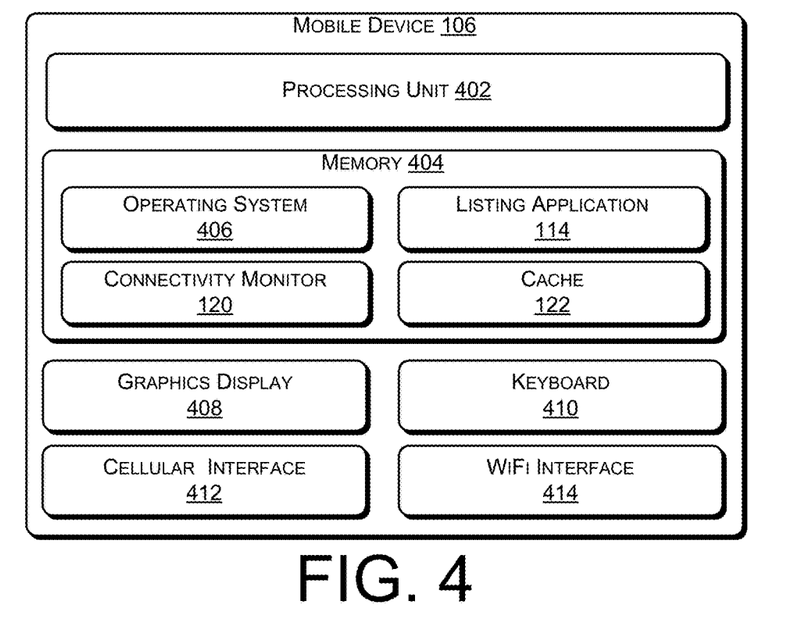
FIG. 4 is a block diagram showing high-level components of a mobile device such as may be used in conjunction with the online marketplace system.

FIG. 3 shows an example method 300 that may be performed by the mobile device 106 or by another device associated with the seller 104, to list items for sale by an online marketplace. Although the method 300 will be described in the context of the architecture shown in FIG. 1, the example method 300 may be performed in conjunction with systems having different architectures and implementation details.

An action 302 comprises presenting a graphical user interface 202 on a display of the mobile device 106 of the seller 104. As described with reference to FIG. 2, the graphical user interface 202 has controls for receiving listing information from the seller 104 regarding an item 118 that is to be listed for sale by the online marketplace system 102 on behalf of the seller 104.

An action 304 comprises receiving the listing information from the seller 104, by means of accepting data input into the controls of the user interface 202. In the described embodiment, the received listing information may comprise one or more of:

a picture of the item;
    a video of the item;
    a description of the item;
    a sale price of the item;
    a title for the listing;
    a condition of the item; or
    contact information of a seller of the item.

An action 306 comprises evaluating the current data connectivity of the mobile device 106, and in particular evaluating the current data connectivity between the mobile device 106 and the online marketplace system 102. The data connectivity may be evaluated in terms of predefined criteria, which may relate generally to availability, speed, consistency/intermittency, rates of dropped data, cost, type (cellular vs. WiFi), etc.

The action 306 further comprises determining whether the current data connectivity satisfies one or more connectivity criteria. The connectivity criteria may comprise one or more of:

that the mobile device 106 currently has data connectivity with the online marketplace system 102;
    that the data connectivity of the mobile device 106 is unmetered such as may be the case when the mobile device 106 is connected through WiFi rather than a cellular provider;

that a rate of dropped data between the mobile device 106 and the online marketplace system 102 does not exceed a first threshold;

that a speed of the data connectivity of the mobile device 106 exceeds a second threshold;

that there is currently no usage charge for the data connectivity of the mobile device 106, such as may be the case when the mobile device 106 is connected through WiFi rather than a cellular provider; or that a usage charge for the data connectivity of the device does not exceed a third threshold, such as when the mobile device is on a "home" cellular network rather than a "roaming" network.

Upon determining that the current data connectivity of the mobile device 106 does satisfy the one or more connectivity criteria, an action 308 is performed of transmitting a request to the online marketplace system 102 to create a listing for the item 118 on behalf of the seller 104, and transmitting the listing information to the online marketplace system 102 for inclusion by the online marketplace system in 102 in the listing. In this case, where the data connectivity satisfies the connectivity criteria, the action 308 may be performed without caching the listing information.

Upon determining that the current data connectivity of the mobile device 106 fails to satisfy the one or more connectivity criteria, an action 310 is performed of caching the received listing information on the mobile device 106 for delayed or future transmission to the online marketplace system 102. For example, pictures of the item and accompanying textual information may be stored in non-volatile memory of the mobile device 106 where it will be accessible to the listing application 114 at a later time, when communications between the mobile device 106 and the online marketplace system improve.

Subsequent to caching the listing information, an action 312 is performed of again evaluating the current data connectivity of the mobile device 106 and determining whether the connectivity satisfies the one or more connectivity criteria. The action 312 may be performed similarly or identically to the action 306. If the connectivity criteria fail to be satisfied, the action 312 is repeated periodically to detect the situation in which the connectivity criteria may in the future become satisfied.

If the connectivity criteria are determined to have become satisfied in the action 312, an action 314 is performed of determining whether the cached listing data has become "stale," such as may be the case when the cached listing data is not transmitted to the online marketplace system 102 within a time limit specified by the seller 104. For example, the seller 104 may configured the listing application 114 with a time period or time limit within which listing data is to be posted or transmitted by the listing application 114. If the listing data is not posted within that time, the listing data may be considered to be stale, and an action 316 may be performed of prompting the seller 104 for new or continued authorization to transmit the listing data to the online marketplace system 102. More specifically, the seller 104 may be asked whether he or she wants to cancel the listing or place the listing. If the seller indicates that they want to cancel the listing, an action 318 is performed of canceling the listing, and the cached listing information is removed or deleted without being transmitted to the online marketplace system. If the seller 104 indicates they do not want to cancel the listing, or if the action 314 has indicated that the listing data has not become stale, the action 308 is performed of sending a request to create the listing and transmitting the listing data to the online marketplace system 102.

Figure 5:
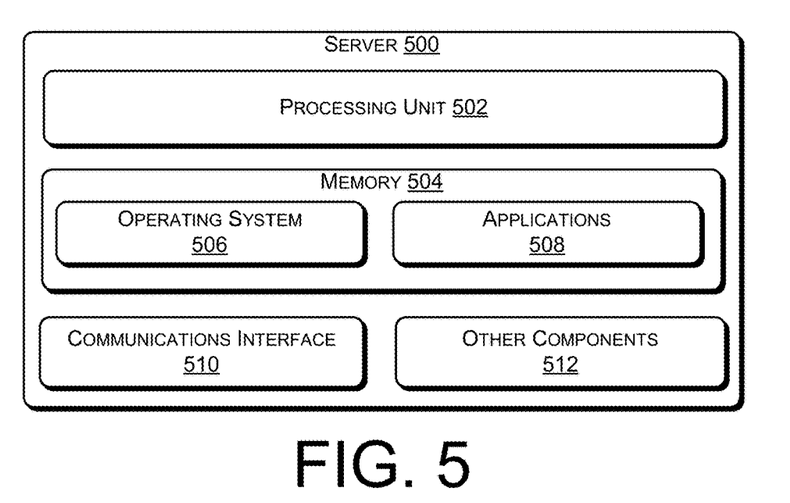
FIG. 5 is a block diagram showing high-level components of an example server that may be used to implement an online marketplace system.

FIG. 5 illustrates relevant components of a mobile device 106 that may be used in conjunction with the system described above. The device 106 may comprise a computerized device having network or other communications capabilities. For example, the device 106 may comprise a tablet computer, a smartphone, a media consumption device, a gaming device, or any other type of device that is capable of accepting input from a customer.

In a very basic configuration, the example device 106 may comprise a processing unit 402 and associated memory 404. The processing unit 402 may comprise one or more processors, which may include general-purpose processors, specialized processors, processing cores, digital signal processors, etc. Depending on the configuration of the device 106, the memory 404 may be a type of non-transitory computer-readable storage media and may include volatile and non-volatile memory. The memory 404 may include, but is not limited to, RAM, ROM, EEPROM, flash memory, or other memory technology. The memory 404 may include removable or detachable memory and may also include network-accessible memory. The memory 404 may include portable storage media such as a flash memory drive.

The memory 404 may be used to store any number of software components that are executable by the processing unit 402. In many embodiments, these software components comprise instructions or programs that are executable by the processing unit 402, and that when executed implement operational logic for performing the actions attributed above to the mobile device 106.

Software components stored in the memory 404 may include an operating system 406 and one or more application programs that are installed by the end user of the device. Each application program comprises instructions that are configured for execution by one or more processors of the mobile device 106. Application programs such as this are often referred to simply as applications or "apps." The installed applications may include the listing application 114 and the connectivity monitor 120. In some cases the connectivity monitor 120 may be part of the listing application 114. The cache 122 may also be part of the memory 404.

Physical components of the device 106 may include a graphics display 408 and a keyboard 410 for presenting information to and receiving information from the customer. The mobile device 106 may have a cellular network interface 412 for communications using cellular communications networks such as GSM networks, CDMA networks, etc. The mobile device 106 may also have a WiFi interface 414 for wireless networking using public and private WiFi networks. In some cases, the mobile device 106 may be configured to preferentially use the WiFi interface 414 as opposed to the cellular interface 412, because WiFi connectivity, which available, is often faster and less expensive than cellular connectivity. The cellular and WiFi interfaces 412 and 414 may allow communications with the online marketplace system through a public wide-area network such as the Internet.

The mobile device 106 may have various other physical and logical components, depending on the nature of the device and its intended functionality.

FIG. 5 illustrates relevant components of an example server 500 that may be used to implement the functionality of the online marketplace system 102, including the application servers 124 and the web servers 126. Generally, the online marketplace system 102 may be implemented by one or more servers, with the various functionality of the online marketplace system 102 distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises. Furthermore, the online marketplace system 102 may be part of a larger infrastructure that provides various types of functions and services to multiple entities, not limited to the functions and services described above.

In a very basic configuration, the example server 500 may comprise a processing unit 502 and associated memory 504. The processing unit 502 may comprise one or more processors, which may include general-purpose processors, specialized processors, processing cores, digital signal processors, etc. Depending on the configuration of the server 500, the memory 504 may be a type of non-transitory computer-readable storage media and may include volatile and non-volatile memory. The memory 504 may include, but is not limited to, RAM, ROM, EEPROM, flash memory, or other memory technology. The memory 504 may include removable or detachable memory and may also include network-accessible memory. The memory 504 may include portable storage media such as a flash memory drive.

The memory 504 may be used to store any number of software components that are executable by the processing unit 502. In many embodiments, these software components comprise instructions or programs that are configured for execution by the processing unit 502, and that when executed implement operational logic for performing the actions attributed above to the online marketplace system 102. Software components stored in the memory 504 may include an operating system 506 and one or more applications 508.

The server 500 may have a communication interface 510, such as an Ethernet communications interface, which provides communication by the server 500 with other servers, with the Internet, and ultimately to multiple mobile devices 106 and customer devices 132.

The server 500 may of course include many other logical, programmatic, and physical components 512 that are not specifically described herein.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. One or more non-transitory computer-readable media storing an application that is configured for execution by one or more processors of a mobile device to perform actions comprising:

receiving information regarding an item to be listed for sale on behalf of a seller by an online marketplace system, wherein the information comprises at least one of a picture of the item, a description of the item, contact information for the seller, or a sale price of the item;

comparing mobile data connectivity between the mobile device and the online marketplace system to connectivity criteria associated with a predefined threshold for real-time submission of a listing of the item, wherein the connectivity criteria includes at least the mobile device having the mobile data connectivity to the online marketplace system;

determining that the mobile data connectivity between the mobile device and the online marketplace system fails to satisfy the connectivity criteria;

in response to determining that the mobile data connectivity between the mobile device and the online marketplace system fails to satisfy the connectivity criteria, caching the information on the mobile device for future transmission to the online marketplace system;

subsequent to the caching the information, determining that the mobile data connectivity between the mobile device and the online marketplace system satisfies the connectivity criteria;

transmitting the information cached on the mobile device to the online marketplace system for inclusion by the online marketplace system in the listing of the item; and transmitting a request to the online marketplace system to create the listing of the item on behalf of the seller, wherein the listing of the item includes the information, and wherein at least one of the transmitting the information cached on the mobile device to the online marketplace system or the transmitting the request to the online marketplace system to create the listing of the item is performed within a time limit specified by the seller.

2. The one or more non-transitory computer-readable media of claim 1, wherein the information further comprises at least one of a video of the item, a title for the listing of the item, or a condition of the item.

3. The one or more non-transitory computer-readable media of claim 1, the actions further comprising prompting the seller for authorization before transmitting the request to the online marketplace system based at least in part on determining the information cached on the mobile device exceeds the time limit specified by the seller, and wherein at least one of the transmitting the information cached on the mobile device to the online marketplace system or the transmitting the request to the online marketplace system to create the listing of the item is performed after the time limit specified by the seller and is based at least in part on receiving the authorization from the seller.

4. The one or more non-transitory computer-readable media of claim 1, wherein the connectivity criteria comprises the mobile data connectivity currently existing between the mobile device and the online marketplace system.

5. The one or more non-transitory computer-readable media of claim 1, wherein the connectivity criteria comprises at least one of that a rate of dropped data between the mobile device and the online marketplace system does not exceed a first threshold or that a speed of the mobile data connectivity between the mobile device and the online marketplace system exceeds a second threshold.

6. A device, comprising:

a display;

one or more processors; and one or more non-transitory computer-readable media storing computer-executable instructions that, when executed on the one or more processors, cause the one or more processors to perform actions comprising:

presenting a graphical user interface on the display, the graphical user interface having controls for receiving information regarding an item to be listed for sale by an online marketplace system;

determining that data connectivity of the device fails to satisfy one or more connectivity criteria, wherein the determining is based on a comparison of the data connectivity between the device and the online marketplace system to the one or more connectivity criteria associated with a predefined threshold for real-time submission of a listing of the item, and wherein the one or more connectivity criteria includes at least the mobile device having the data connectivity with the online marketplace;

caching the information in the one or more non-transitory computer-readable media for future transmission to the online marketplace system;

subsequent to the caching the information, determining that the data connectivity of the device satisfies the one or more connectivity criteria; and transmitting the information cached in the computer-readable media to the online marketplace system for inclusion by the online marketplace system in the listing of the item, wherein the transmitting is performed within a predefined time limit specified by a seller.

7. The device of claim 6, wherein the data connectivity comprises cellular data connectivity.

8. The device of claim 6, wherein the one or more connectivity criteria comprises that the device currently has the data connectivity with the online marketplace system.

9. The device of claim 6, wherein the one or more connectivity criteria comprises at least one of that the data connectivity of the device is unmetered; that a rate of dropped data between the device and the online marketplace system does not exceed a first threshold; that a speed of the data connectivity of the device exceeds a second threshold; that there is currently no usage charge for the data connectivity of the device; or that a usage charge for the data connectivity of the device does not exceed a third threshold.

10. The device of claim 6, wherein the predefined time limit begins after receiving the information.

11. The device of claim 6, the actions further comprising prompting for authorization before the transmitting the information cached in the one or more non-transitory computer-readable media to the online marketplace system.

12. The device of claim 6, wherein the information comprises a picture of the item.

13. The device of claim 6, wherein the information comprises at least one of a video of the item; a description of the item; a price of the item; a title for the listing of the item; a condition of the item; or contact information of the seller of the item.

14. A method, comprising:

receiving, at a mobile computing device, information regarding an item to be listed for sale by an online marketplace system;

comparing data connectivity between the mobile computing device and the online marketplace system to connectivity criteria associated with a predefined threshold for real-time submission of a listing of the item wherein the connectivity criteria includes at least the mobile computing device having the data connectivity with the online marketplace system;

determining that the data connectivity between the mobile computing device and the online marketplace system fails to satisfy the connectivity criteria;

caching, on the mobile computing device, the information for future transmission to the online marketplace system;

subsequent to the caching the information, determining that the data connectivity between the mobile computing device and the online marketplace system satisfies the connectivity criteria; and transmitting, from the mobile computing device, the information cached on the mobile computing device to the online marketplace system for inclusion by the online marketplace system in the listing of the item, wherein the transmitting the information is performed within a predefined time period specified by a seller.

15. The method of claim 14, wherein the data connectivity comprises cellular data connectivity.

16. The method of claim 14, wherein the connectivity criteria comprises that the data connectivity currently exists with the online marketplace system.

17. The method of claim 14, wherein the connectivity criteria comprises at least one of that the data connectivity is unmetered; that a rate of dropped data does not exceed a first threshold; that a speed of the data connectivity exceeds a second threshold; that there is currently no usage charge for the data connectivity; or that a usage charge for the data connectivity does not exceed a third threshold.

18. The method of claim 14, wherein the predefined time period begins after receiving the information.

19. The method of claim 14, further comprising prompting for authorization before transmitting the information cached on the mobile computing device to the online marketplace system.

20. The method of claim 14, wherein the information comprises at least one of a picture of the item; a video of the item; a title for the listing of the item; a description of the item; a price of the item; a condition of the item; or contact information of the seller of the item.

21. The method of claim 14, further comprising displaying a graphical user interface on a display of the mobile computing device, wherein the graphical user interface is configured to receive the information.

* * * * *